US007246487B2

(12) United States Patent
Hara (10) Patent No.: US 7,246,487 B2
(45) Date of Patent: Jul. 24, 2007

(54) EXHAUST-HEAT RECOVERY SYSTEM FOR ENGINE

(75) Inventor: Junichiro Hara, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 257 days.

(21) Appl. No.: 10/715,107

(22) Filed: Nov. 18, 2003

(65) Prior Publication Data

US 2004/0144084 A1 Jul. 29, 2004

(30) Foreign Application Priority Data

Nov. 19, 2002 (JP) ............. P 2002-334882

(51) Int. Cl.
*F01N 3/00* (2006.01)
*F01N 5/02* (2006.01)
(52) U.S. Cl. ............. 60/298; 60/285; 60/286; 60/320
(58) Field of Classification Search ............. 60/320, 60/300, 285, 287, 298
See application file for complete search history.

(56) References Cited

U.S. PATENT DOCUMENTS

| | | | | | |
|---|---|---|---|---|---|
| 3,223,150 | A | * | 12/1965 | Tramontini | ............. 165/297 |
| 3,779,307 | A | * | 12/1973 | Weiss et al. | ............. 165/42 |
| 4,146,176 | A | * | 3/1979 | Beauvais et al. | ....... 237/12.3 A |
| 4,884,744 | A | * | 12/1989 | Padgaonkar | ........... 237/12.3 R |
| 5,934,073 | A | | 8/1999 | Gieshoff et al. | |
| 5,983,628 | A | * | 11/1999 | Borroni-Bird et al. | ........ 60/274 |
| 6,044,642 | A | * | 4/2000 | Nishimura et al. | ........... 60/285 |
| 6,141,961 | A | * | 11/2000 | Rinckel | ........... 60/288 |
| 6,151,891 | A | * | 11/2000 | Bennett | ........... 60/298 |
| 6,266,957 | B1 | * | 7/2001 | Nozawa et al. | ........... 60/284 |
| 6,272,850 | B1 | * | 8/2001 | Grant et al. | ........... 60/277 |
| 6,318,077 | B1 | * | 11/2001 | Claypole et al. | ........... 60/303 |
| 6,330,796 | B1 | * | 12/2001 | Nishimura et al. | ........... 60/286 |
| 6,345,499 | B1 | * | 2/2002 | Nishimura et al. | ........... 60/277 |
| 6,622,480 | B2 | * | 9/2003 | Tashiro et al. | ........... 60/295 |
| 6,739,579 | B1 | * | 5/2004 | Rim | ........... 251/306 |

FOREIGN PATENT DOCUMENTS

GB        2 333 584 A      7/1999
JP        1-132415 A       5/1989

OTHER PUBLICATIONS

Oguri et al., Mechanical Engineering Handbook, Japan Society of Mechanical Engineers, Apr. 15, 1987, pp. B7-27 and B7-31 (English Abstract attached).

* cited by examiner

*Primary Examiner*—Thomas Denion
*Assistant Examiner*—Loren Edwards
(74) *Attorney, Agent, or Firm*—Foley & Lardner LLP (57) ABSTRACT

An exhaust-heat recovery system includes a catalytic converter, an exhaust heat exchanger, an air conditioner and an engine controller. The catalytic converter is such that exhaust discharged from an engine passes therethrough and combustible components in the exhaust are catalytically burned therein. The exhaust heat exchanger induces heat exchange between the exhaust having passed through the catalytic converter and a coolant having passed through the engine. The air conditioner generates a heating wind by means of the heat exchange between the coolant having passed through the exhaust heat exchanger and an air conditioning wind. The engine controller controls incrementally the combustible components in the exhaust to be burned in the catalytic converter when a prescribed heating condition is unsatisfied.

22 Claims, 4 Drawing Sheets

EXHAUST-HEAT RECOVERY SYSTEM FOR ENGINE

CROSS REFERENCE TO RELATED APPLICATION

This application claims benefit of priority under 35. U.S.C § 119 to Japanese Patent Application No. 2002-334882, filed on Nov. 19, 2002, the entire contents of which are incorporated by reference herein.

BACKGROUND OF THE INVENTION

1. Field of the Invention

The present invention relates to an exhaust-heat recovery system for an engine in order to utilize exhaust heat for air conditioning, heating, etc. by means of efficient recovery thereof from the engine.

2. Description of the Related Art

There has been conventionally well known a system disclosed in JP 1-132415A, which utilizes exhaust heat from an engine for heating the interior of a vehicle. The system heats a coolant for the engine utilizing the exhaust heat and sends a heating wind into the interior of the vehicle by passing the heated coolant through a heat exchanger disposed along a warm-air duct.

The system has a problem that the volume and temperature of the exhaust vary depending upon the magnitude of a load on the engine. When the load on the engine is large enough to generate sufficient exhaust heat, a coolant for the engine is efficiently heated using the exhaust heat. When the engine is idling (the vehicle is at rest but the engine is still in operation) in a cold period such as winter, the volume of the exhaust is small and the temperature thereof is also low due to a very small load.

Therefore, when the engine is idling in a cold period, it is difficult to heat the coolant for the engine using only the exhaust from the engine in order to heat the interior of the vehicle.

SUMMARY OF THE INVENTION

The object of the present invention is to provide an exhaust-heat recovery system for an engine such that heat quantity of exhaust is increased by means of promoting combustion of the exhaust through catalysis using a catalytic converter in the case where sufficient heat quantity cannot be obtained.

In order to achieve the above object, the present invention provides an exhaust-heat recovery system for an engine comprising: a catalytic converter through which exhaust discharged from the engine is passed and in which combustible components in the exhaust are burned through catalysis; an exhaust heat exchanger where heat is exchanged between the exhaust having passed through the catalytic converter and a heat-transfer medium having passed through the engine; an air conditioner with a heat exchanger for heating where a heating wind is generated by means of the heat exchange between the heat-transfer medium having passed through the exhaust heat exchanger and an air conditioning wind; and an engine controller for performing incremental control on the combustible components in the exhaust to be burned in the catalytic converter when a prescribed condition for heating is not satisfied.

According to the present invention, since the engine controller controls incrementally the combustible components in the exhaust to be burned in the catalytic converter when the prescribed condition for heating is not satisfied, the combustion in the catalytic converter is promoted to increase the heat quantity of the exhaust as well as to increase efficiently the temperature of the heat-transfer medium to exchange heat with the exhaust in the exhaust heat exchanger.

Consequently, even when sufficient heat quantity of the exhaust from the engine cannot be obtained, the heat-transfer medium can be raised up to a high temperature by the sufficient exhaust heat, and thereby the air conditioning wind exchanging heat with the heat-transfer medium in the heat exchanger for heating can be efficiently warmed to produce a desired heating wind.

Further, since the heat-transfer medium can be heated quicker, the engine can also be heated quickly to raise the temperature of an engine lubricant. Thereby, viscosity of the lubricant can be reduced to decrease friction loss of the engine and to improve mileage.

DESCRIPTION OF THE PREFERRED EMBODIMENT

A first embodiment of the present invention will be described referring to FIGS. 1 to 3.

Figure 1:
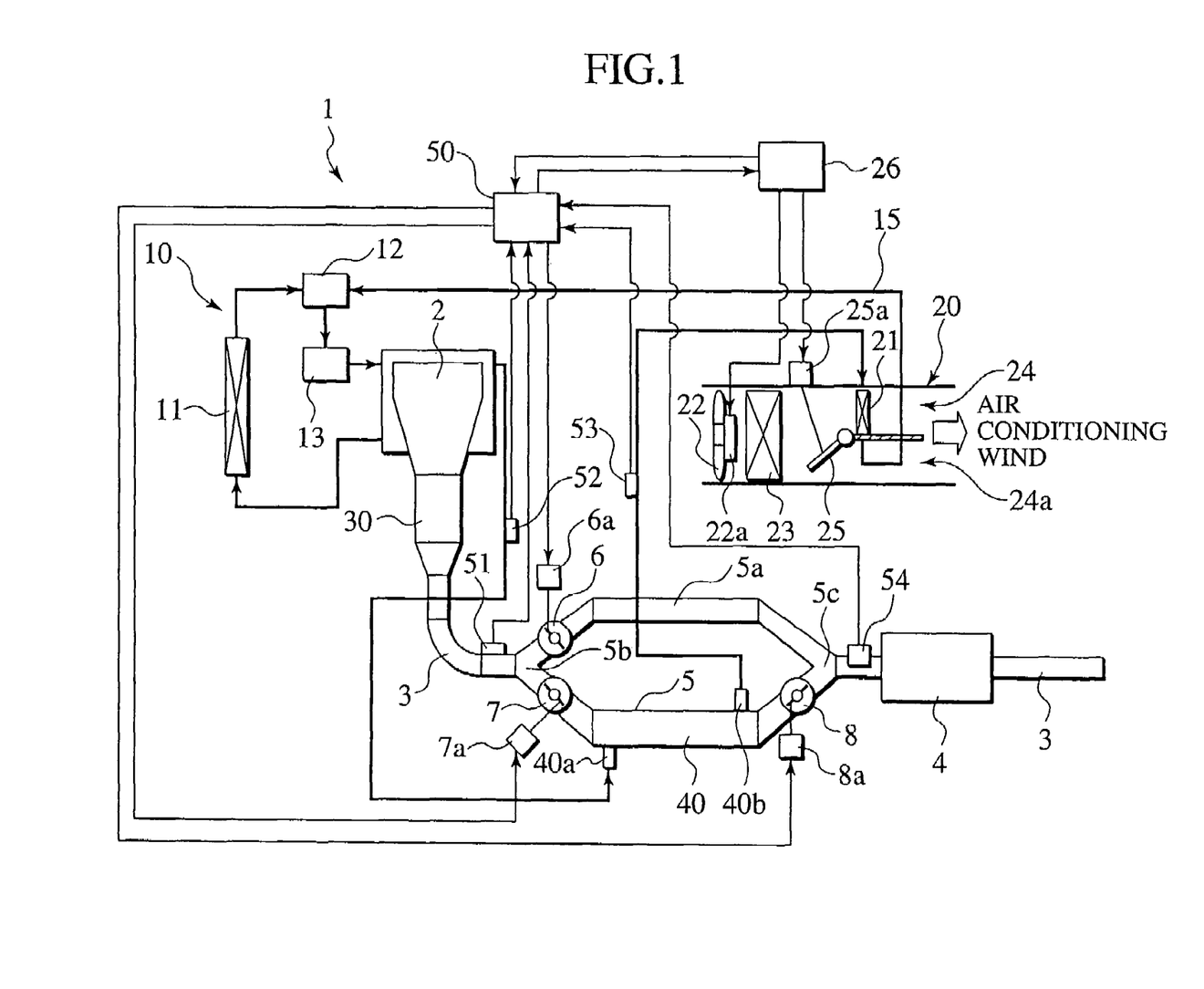
FIG. 1 is a diagram showing a schematic overall configuration of a first embodiment of the present invention.

An exhaust-heat recovery system for an engine 1 includes, as shown in FIG. 1, an engine cooling system 10, an air conditioner 20, a catalytic converter 30, an exhaust heat exchanger 40 and an engine controller 50. The engine cooling system 10 cools an on-vehicle engine 2 by means of heat exchange with a coolant (a heat-transfer medium). The air conditioner 20 introduces a heated coolant of a heating medium circulation channel 15 into the interior of a heater core 21 (a heat exchanger for heating) and then generates a heating wind by means of heat exchange between an air conditioning wind and the heated coolant. The catalytic converter 30 burns combustible components in the exhaust through catalysis by passing the exhaust from the engine 2 in the interior thereof. The exhaust heat exchanger 40 causes the exhaust, which has passed through the catalytic converter 30, to exchange the heat with the coolant of the heating medium circulation channel 15. The engine controller 50 is an engine control means and, as described later, increases the combustible components in the exhaust to be burned in the catalytic converter 30 when a condition for heating is not satisfied.

The exhaust from the engine 2 is usually released into the air from the rear of a vehicle by connecting an exhaust pipe 3 to an exhaust manifold (not shown in the figure) of the engine 2. The catalytic converter 30 is disposed at the end on the upstream side of the exhaust pipe 3. The exhaust heat exchanger 40 and a muffler 4 are disposed downward of the exhaust pipe 3 in this order.

The exhaust pipe 3 has a main channel 5 and a bypass channel 5a, and includes a first switch valve 6, a second switch valve 7 and a third switch valve 8 are provided in the interior thereof. The main channel 5 has the exhaust heat exchanger 40 along the interior thereof The exhaust, which has passed through the catalytic converter 30, bypasses the exhaust heat exchanger 40 by passing through the bypass channel 5a. The first switch valve 6, the second switch valve 7 and the third switch valve 8 are exhaust channel switching valves and define the channel through which the exhaust passes by closing either the main channel 5 or the bypass channel 5a.

The first switch valve 6 is provided at the inlet portion of the bypass channel 5a. The second switch valve 7 is provided at the inlet portion of the main valve 5. The third switch valve 8 is provided at the outlet portion of the main channel 5. Actuators 6a, 7a and 8a are driven with control signals from the engine controller 50 to open or shut the first switch valve 6, the second switch valve 7 and the third switch valve 8 respectively.

The engine cooling system 10 is a coolant channel, which circulates the coolant sequentially through the engine 2, a radiator 11, a thermostat 12, a water pump 13 and the engine 2. The coolant in the engine 2 flows out of a cooling channel disposed within a cylinder block and a cylinder head of the engine 2, and circulates along the engine cooling system 10. In the engine cooling system 10, the coolant flows via the radiator 11 and the thermostat 12 into the water pump 13, and is delivered under pressure to the engine 2.

The heating medium circulation channel 15 is another coolant channel, which circulates the coolant sequentially through the engine 2, the exhaust heat exchanger 40, the heater core 21, the thermostat 12, the water pump 13 and the engine 2. The coolant in the engine 2 circulates along the heating medium circulation channel 15 in addition to the engine cooling system 10. In the heating medium circulation channel 15, the coolant passes through the exhaust heat exchanger 40 and the heater core 21, and then is delivered under pressure to the engine 2 via the thermostat 12 and the water pump 13.

The thermostat 12 controls the flow rate of the coolant passing through the engine cooling system 10 and the heating medium circulation channel 15 by detecting a coolant temperature. When the temperature of the coolant is lower than the prescribed one (for example, 80° C.), the thermostat 12 shuts down the engine cooling system 10 and lets the whole coolant pass through the heating medium circulation channel 15.

The air conditioner 20 includes the heater core 21, a fan 22, an evaporator 23 and an air-mixing door 25. The fan 22 generates an air conditioning wind. The evaporator 23 is disposed on the downstream side of the fan 22 and composes a refrigerating cycle (not shown in the figure). The heater core 21 for heating is disposed on the downstream side of the evaporator 23. The air-mixing door 25 is disposed between the evaporator 23 and the heater core 21 and closes either the inlet portion of a channel 24 or that of a channel 24a, wherein the channel 24 passes an air conditioning wind through the heater core 21, and the channel 24a passes an air conditioning wind so as to bypass the heater core 21.

The refrigerating cycle includes, as generally known, a compressor (not shown in the figure) for pressing a refrigerant, a condenser (not shown in the figure) for cooling the refrigerant at high pressure with the air outside and an expansion valve (not shown in the figure) for adiabatically expanding the refrigerant having been liquidized by the condenser. Through the function of the expansion valve, the refrigerant expands adiabatically turning to be at a low pressure and a low temperature. Then, the air conditioning wind is cooled and dehumidified by passing the refrigerant through the evaporator 23 to exchange heat between the refrigerant and the air conditioning wind.

Through the heater core 21 passes a heated coolant circulating along the heating medium circulation channel 15. By exchanging heat between the heated coolant and the air conditioning wind flowing along the channel 24, the air conditioning wind is warmed up and blows as a heating wind into the interior of the vehicle.

A plurality of signals outputted from an air conditioning controller 26 controls rotation of a fan motor 22a of the fan 22, degree of opening of the air-mixing door 25 controlled by an actuator 25a and driving of the compressor, respectively. The air conditioning controller 26 is connected to the engine controller 50 and interchanges information therewith.

When an occupant operates manual levers (not shown in the figure) or manual buttons on an air conditioning operation panel (not shown in the figure) to change the target temperature in the interior of the vehicle, the information is inputted into the air conditioning controller 26 and then is outputted from the air conditioning controller 26 to the engine controller 50. The engine controller 50 decides whether an increase in heating power of the air conditioner 20 is necessary or not, on the basis of the difference between the target-temperature set by the occupant and the actual temperature in the interior of the vehicle.

The catalytic converter 30 reduces hazardous components in exhaust. In catalytic processes employed in the catalytic converter 30, an oxidation catalyst type and a ternary catalyst type are known. The oxidation catalyst type process is of a type such that CO or HC in exhaust is oxidized and thus requires excess oxygen in the exhaust. The ternary catalyst type process is of a type such that reduction of NOx and oxidation of CO or HC are processed at once by passing exhaust through a catalyst at a theoretical air-fuel ratio or extremely near to it. Both processes heat the catalytic converter 30 by burning (oxidizing) combustible components in exhaust.

An exhaust temperature sensor 51 is provided between the catalytic converter 30 and a branching portion 5b at which the inlet portions of the main channel 5 and the bypass channel 5a are borne. A value detected by the exhaust temperature sensor 51 is outputted to the engine controller 50.

The exhaust heat exchanger 40 is provided along the main channel 5. The exhaust heat exchanger 40 efficiently receives heat from exhaust passing along the main channel 5. Further, providing an introducing inlet 40a and a discharging outlet 40b for a coolant on the exhaust heat exchanger 40, the coolant is heated through exchanging heat between the coolant and the exhaust by passing the coolant therethrough along the heating medium circulation channel 15. The heated coolant flows out from the discharging outlet 40b and is delivered to the heater core 21 of the air conditioner 20.

Along the heating medium circulation channel 15, water temperature sensors 52, 53 are respectively provided between the engine 2 and the exhaust heat exchanger 40 and between the exhaust heat exchanger 40 and the heater core 21. Values T1, T2 detected by the water temperature sensor 52, 53 are outputted to the engine controller 50.

An exhaust flow rate sensor 54 is provided between the muffler 4 and a joining portion 5c at which the outlet portions of the main channel 5 and the bypass channel 5a are borne. A value detected by the exhaust flow rate sensor 54 is outputted to the engine controller 50.

Into the engine controller 50, inputted are the detected values from the exhaust temperature sensor 51, the water temperature sensors 52, 53 and the exhaust flow rate sensor 54, the target temperature in the interior of the vehicle from the air conditioning controller 26, the signals such as a vehicle speed, an accelerator aperture, an on-off about the engine operation (an ignition switch) and a temperature of the coolant passing through the engine 2. The engine controller 50 decides a condition for heating on the basis of these input signals. When the condition for heating is not fulfilled, the amount of combustible components in the exhaust to be burned in the catalytic converter 30 will be controlled incrementally if necessary.

Figure 2:
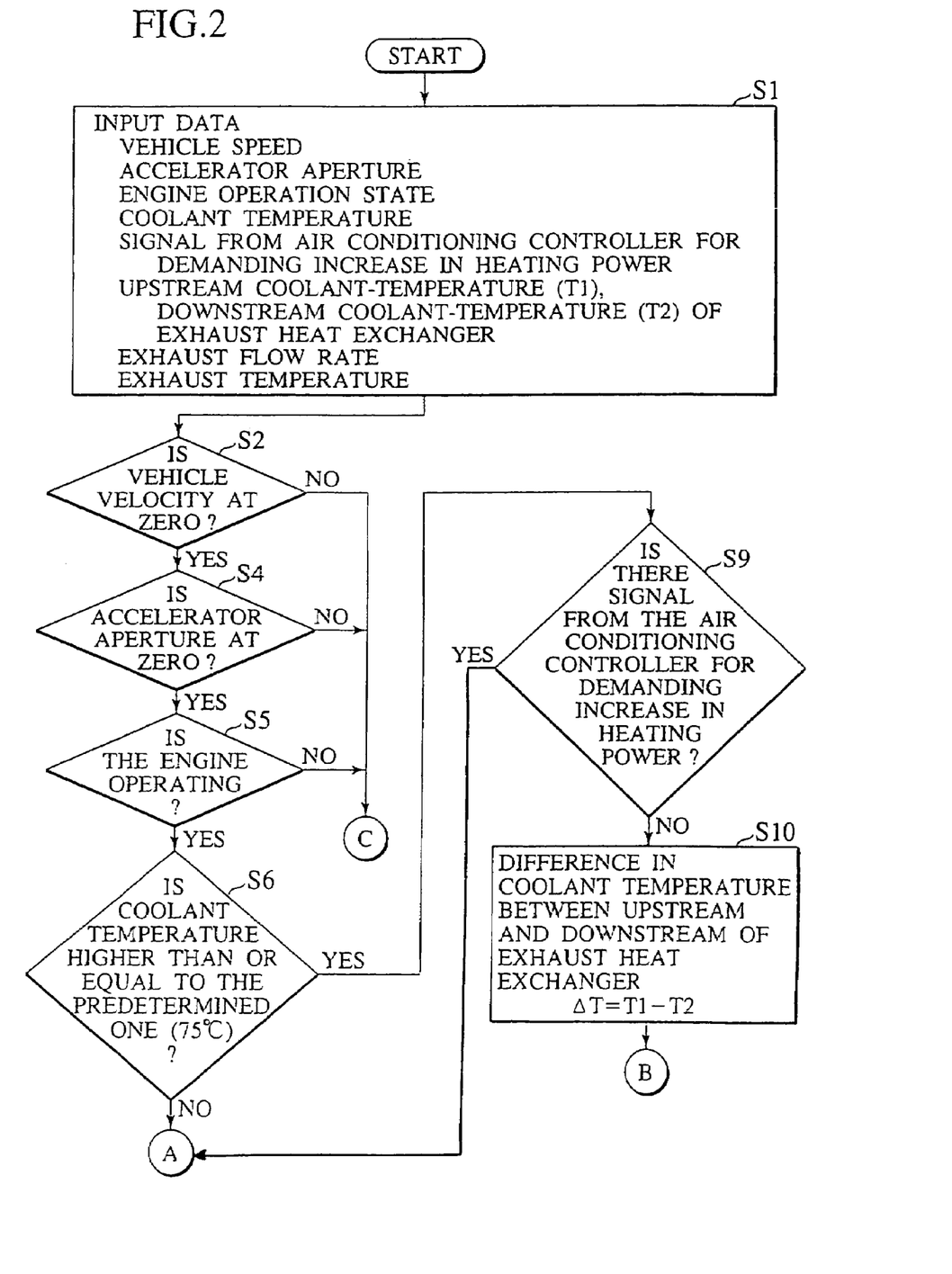
FIG. 2 is a diagram showing the first half of a flow chart for performing the exhaust-heat recovery control according to the first embodiment of the present invention.
Figure 3:
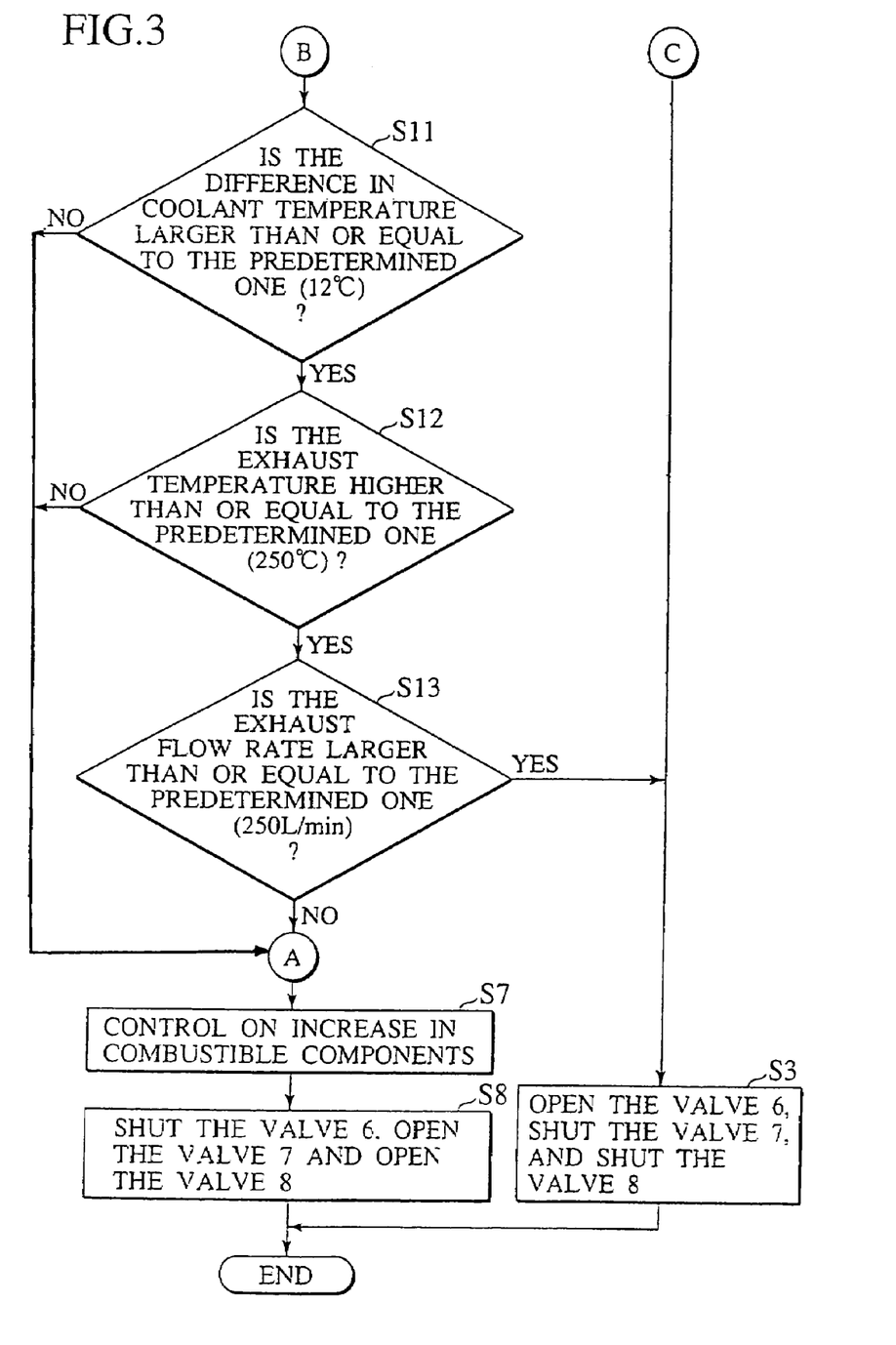
FIG. 3 is a diagram showing the second half of a flow chart for performing the exhaust-heat recovery control according to the first embodiment of the present invention.

The engine controller 50 performs, according to a flow chart shown in FIG. 2 and FIG. 3, the incremental control on the amount of the combustible components. In the step S1, the above data is inputted to the engine controller 50 for deciding the heating condition.

In the step S2, it is decided whether the vehicle is at rest or in motion by judging whether the vehicle speed is at zero or not. When the vehicle is in motion, the incremental control will not be performed and the process will be forwarded to the step S3. When the vehicle is at rest, the process will be forwarded to the step S4 because of satisfying the condition for the incremental control on the combustible components.

In the step S3, the exhaust from the engine 2 passes along the bypass channel 5a by opening the first switch valve 6 and shutting the second switch valve 7 and the third switch valve 8. By closing the main channel 5, the exhaust will be prevented from passing through the exhaust heat exchanger 40.

In the step S4, it is decided whether the engine 2 is unloaded or loaded by judging whether the acceleration aperture is at zero or not. When the engine 2 is loaded with the acceleration aperture having been turned on, the incremental control on the combustible components will not be performed and the process will be forwarded to the step S3. When the acceleration aperture is at zero, the process will be forwarded to the step S5 because of satisfying the condition for the incremental control on the combustible components.

In the step S5, it is decided whether the engine 2 is in operation or at rest. When the engine 2 is at rest, the incremental control on the combustible components will not be performed and the process will be forwarded to the step S3. When the engine 2 is in operation, the process will be forwarded to the step S6 because of satisfying the condition for the incremental control on the combustible components.

In the step S6, it is decided whether the temperature of the coolant is higher than or equal to the prescribed temperature (for example, 75° C.) or less. When the temperature of the coolant is less than the prescribed temperature, the process will be forwarded to the step S7 in order to control incrementally the combustible components. When the temperature of the coolant is higher than or equal to the prescribed temperature, the process will be forwarded to the step S9.

In the step S7, the demand for increasing the amount of the combustible components is outputted from the engine controller 50 to the engine 2.

In the step S8, the exhaust from the engine 2 is passed along the main channel 5 by shutting the first switch valve 6 and opening the second switch valve 7 and the third switch valve 8, and is supplied to the exhaust heat exchanger 40.

In the step S9, it is decided whether the signal for demanding an increase in heating power has been outputted from the air conditioning controller 26 or not. When there exists a demand for an increase in heating power, the process will be forwarded to the step S7 in order to perform the incremental control on the combustible components. When there is no demand for the increase in heating power, the process will be forwarded to the step S10.

In the step S10, calculated is the difference $\Delta T=(T1-T2)$ in the temperatures of the coolant between the upstream side and downstream side of the exhaust heat exchanger 40.

In the step S11, when the difference $\Delta T$ in the temperatures is less than the prescribed temperature (for example 12° C.), the process will be forwarded to the step S7 in order to perform the incremental control on the combustible components. When the difference $\Delta T$ in the temperature is higher than or equal to the prescribed temperature, the process will be forwarded to the step S12.

In the step S12, it is decided whether the exhaust temperature is higher than or equal to the prescribed temperature (for example 250° C.) or less. When the exhaust temperature is less than the prescribed temperature, the process will be forwarded to the step S7 in order to perform the incremental control on the combustible components. When the exhaust temperature is higher than or equal to the prescribed temperature, the process will be forwarded to the step S13.

In the step 13, it is decided whether a flow rate of the exhaust is larger than or equal to the prescribed flow rate (for example 250 L/min) or less. When the flow rate is larger than or equal to the prescribed flow rate, the process will be forwarded to the step S3 without performing the incremental control on the combustible components. When the flow rate is less than the prescribed flow rate, the process will be forwarded to the step S7 in order to control incrementally the combustible components.

The incremental control on the combustible components increases unburned hydrocarbons (HC) in the exhaust from the engine 2.

There are several known methods for increasing unburned hydrocarbons, for example, as described on page B7-27 or on page B7-31 in "Mechanical Engineering Handbook" compiled by Japan Society of Mechanical Engineers (1987 edition). Unburned hydrocarbons are increased by carrying out one of the methods such as making the engine 2 misfire, making the fuel burn partially, decreasing or increasing an air-fuel ratio to a large extent, shifting the ignition timing from the ordinary setting in motion to the other, making the combustion cylinder stop.

According to the above constitution, when the condition for heating is not satisfied in the exhaust-heat recovery system 1 of the first embodiment, the engine controller 50 performs the incremental control on the combustible components (the unburned hydrocarbons in this embodiment) in the exhaust to be burned in the catalytic converter 30. Thereby, the combustion in the catalytic converter 30 is promoted by introducing the exhaust enriched with the unburned hydrocarbons into the catalytic converter 30.

The more heated the interior of the catalytic converter 30 is, the more exhaust heat quantity passing through the catalytic converter 30 increases. Since the coolant within the heating medium circulation channel 15 exchanges heat with the exhaust having been enriched in heat quantity, the coolant temperature can be efficiently increased in the exhaust heat exchanger 40.

Consequently, even when heating power is insufficient or when sufficient exhaust heat is not available due to a small load on the engine 2, the coolant can be heated up to a high temperature by the enriched sufficient exhaust heat. As a result, since an air conditioning wind exchanges heat with the heated coolant in the heater core 21 of the air conditioner 20, the air conditioning wind can be efficiently heated to produce a desired heating wind.

Further, the engine 2 is rapidly warmed up to increase the temperature of a lubricant for the engine by making the heated coolant flow into the engine 2 from the heating medium circulation channel 15. Moreover, since the viscosity of the lubricant is lowered and the friction loss of the engine 2 can be reduced, the mileage can be improved.

In the first embodiment, the incremental control on the combustible components by the engine controller 50 is processed by increasing the amount of the unburned hydrocarbons in the exhaust from the engine 2. Since the unburned hydrocarbons is burned surely and efficiently to increase generated heat quantity in a short time in the catalytic converter 30, the heat quantity given to the coolant is increased and the heating time of the coolant is shortened in the exhaust heat exchanger 40.

Since the incremental control on the combustible components is performed when the vehicle is at rest but the engine 2 is in operation, namely, during idling of the engine 2, it can be avoided that a part of the combustible components may be released into the air beyond the capacity of the catalytic converter 30.

When the combustible components are increased, there is a fear that a part of the combustible components may be released beyond the processing capacity of the catalytic converter 30. However, the catalytic converter 30 has practically such capacity as to be able to burn the combustible components through the reaction at the maximum output of the engine 2. Consequently, the whole amount of the combustible components produced during idling never goes beyond the processing capacity of the catalytic converter 30 and is completely burned out by performing the incremental control on the combustible components during idling of the engine 2.

The heating condition is determined by a temperature of the coolant or by a demand, from the air conditioner 20, for an increase in heating power. When a temperature of the coolant is low, the heating power of the heater core 21 should also be low, and therefore heating power of the heater core 21 will be enhanced through heating the coolant by means of performing the incremental control by the engine controller 50 on the combustible components in the exhaust depending upon the temperature of the coolant.

Further, by means of performing the incremental control by the engine controller 50 on the combustible components in the exhaust in response to a demand for an increase in heating power, a heating temperature desired by the occupant can be obtained.

The heating condition is also determined by an exchanged heat quantity in the exhaust heat exchanger 40, not limiting to the temperature of the coolant or the demand, from the air conditioner 20, for an increase in heating power. When the exchange heat quantity in the exhaust heat exchanger 40 is small, the temperature of the coolant should not be efficiently heated up, and therefore the temperature of the coolant will be efficiently heated up through increasing the exchanged heat quantity by means of performing the incremental control by the engine controller 50 on the combustible components in the exhaust depending upon the exchanged heat quantity.

The temperatures of the coolant, which determine the heating condition, are detected by the water temperature sensor 52 provided on the coolant channel extending from the engine 2 to the exhaust heat exchanger 40 and by the water temperature sensor 53 provided on the coolant channel extending from the exhaust heat exchanger 40 to the heater core 21. Since the water temperature sensor 52, 53 are provided on the heating medium circulation channel 15 without including the radiator 11, the temperature of the coolant flowing into the heater core 21 can be measured accurately.

Locations at which temperatures of the coolant are measured can be any one of the locations except those mentioned above, such as the coolant channel 15 from the heater core 21 to the engine 2, the coolant channel in the engine 2, the coolant channel in the exhaust heat exchanger 40, the coolant channel in the heater core 21.

Since a demand, which decides the heating condition, for an increase in heating power of the air conditioner 20 is judged on the basis of the difference between a target temperature in the interior of the vehicle set by the occupant and an actual temperature in the interior of the vehicle, namely a room temperature deviation, a shortage of the heating power of the air conditioner 20 can be detected accurately enough to produce a desired heating wind in response to the occupant's choice.

A similar working effect can be obtained, even if a demand for an increase in heating power is judged on the basis of the difference between an outdoor temperature and an indoor temperature, or the difference between a target blow down temperature and an actual blow down temperature, and is not limiting to the difference between a target temperature in the interior of the vehicle and an actual temperature therein.

Further, as a method for judging a demand for an increase in heating power, adding to the above mentioned methods, a method of decision by detecting a surface temperature of the occupant or those of interior parts with an infrared-rays sensor and comparing them with a prescribed target value, or a method of judgment on the basis of the difference between a temperature of the external air and a target room temperature can be selected.

Since heat quantity exchanged in the exhaust heat exchanger 40, on which a heating condition is to be determined, is judged on the basis of the difference between an inlet temperature and an outlet temperature having been detected by the water temperature sensors 52, 53, of the coolant passing through the exhaust heat exchanger 40, the incremental control on the combustible components can be precisely performed due to the fact that the exchanged heat quantity in the exhaust heat exchanger 40 can be measured accurately.

A similar working effect can be obtained, even if an exchanged heat quantity in the exhaust heat exchanger 40 is judged on the basis of the difference between an inlet temperature and an outlet temperature of the exhaust passing through the exhaust heat exchanger 40, the difference in volumetric flow rates of the exhaust passing through the exhaust heat exchanger 40 between at an inlet portion and at an outlet portion, an exhaust volume or an exhaust temperature in the engine 2, or a fuel or an air volume used in the engine 2.

To be more precise, temperatures of the coolant at the inlet portion and at the outlet portion of the exhaust heat exchanger 40 are detected respectively to find the difference in temperature therebetween. If the temperature difference is smaller than a prescribed value, it will be decided that the above mentioned exchanged heat quantity is smaller than a prescribed value. For example, if the difference in temperatures (usually, the temperature at the outlet portion is higher) of the coolant in the engine 2 at the inlet portion and at the outlet portion of the exhaust heat exchanger 40 is smaller than 5° C., it will be decided that the exchanged heat quantity is smaller than the prescribed value.

Further, temperatures of the exhaust at the inlet portion and at the outlet portion of the exhaust heat exchanger 40 are detected respectively to find the difference in temperature therebetween. If the temperature difference is smaller than a prescribed value, it will be decided that the above mentioned exchanged heat quantity is smaller than a prescribed value. For example, if the difference in temperatures (usually, the temperature at the inlet portion is higher) of the exhaust at the inlet portion and at the outlet portion of the exhaust heat exchanger 40 is smaller than 50° C., it will be decided that the exchanged heat quantity is smaller than the prescribed value.

Here, strictly speaking, the exchanged heat quantity in the exhaust heat changer 40 should be calculated in consideration of specific heat or mass flow rate of an operative fluid. In the first embodiment, the exhaust-heat recovery system 1 is used as a secondary heat source mainly when the vehicle is idling at its start or waiting for the traffic light to change. Therefore, once the vehicle starts running, a load of the engine increases and heat quantity in the exhaust also increases following that, and consequently frequency of using the exhaust-heat recovery system 1 as the secondary heat source will be reduced.

Considering these facts, the specific heat or mass flow rate of the operative fluid can be simply determined because the objects to be detected are a coolant and exhaust. Therefore the amount of the exchanged heat can be estimated even though the above difference in temperature cannot be detected.

When exchanged heat quantity is judged by a volume of the exhaust from the engine 2, it will possibly be decided that the exchanged heat quantity is smaller than a prescribed value only if the volume of the exhaust is smaller than the prescribed value, for example 250 L/min.

When exchanged heat quantity is judged by an exhaust temperature, it will possibly be decided that the exchanged heat quantity is smaller than a prescribed value only if the temperature of the exhaust is lower than the prescribed value, for example 250° C.

When exchanged heat quantity is judged by the difference in volumetric flow rates, at the inlet portion and at the outlet portion, of the exhaust passing through the exhaust heat exchanger 40, it will possibly be decided that the exchanged heat quantity is smaller than a prescribed value only if the difference in the volumetric flow rates is smaller than the prescribed value, for example 40 L/min.

Since exhaust is reduced in its volumetric flow rate by being cooled with the exhaust heat exchanger 40, the exchanged heat quantity will also be large when the difference in flow rates of the exhaust at the inlet portion and at the outlet portion of the exhaust heat exchanger 40 is large.

Exhaust is, after being passed through the catalytic converter 30, passed along either the bypass channel 5a bypassing the exhaust heat exchanger 40 or the main channel 5 including the exhaust heat exchanger 40 by means of the first switch valve 6, the second switch valve 7, and the third switch valve 8. Thereby, since the engine controller 50 determines whether the exhaust passes the exhaust heat exchanger 40 or not, the exhaust can be set not to pass through the exhaust heat exchanger 40 if the coolant is at a high enough temperature not to be necessary to receive heat from the exhaust.

As a result, the coolant can be protected from being heated too high by a high ambient temperature as in summer, etc. and a cost increase can be avoided by preventing enlargement in size of subsidiary cooling systems, such as the radiator 11, an engine cooling fan in the engine cooling system 10 in comparison with the case where the exhaust always passes through the exhaust heat exchanger 40.

Additionally, although the first switch valve 6, the second switch valve 7, and the third switch valve 8 were provided as an exhaust channel switching valve, there is no necessity for limiting it thereto and any valve structures can be employed only if switching between the main channel 5 and the bypass channel 5b can be done therewith.

Since the exhaust from the engine 2 is released into the air after passing through the catalytic converter 30, the exhaust heat exchanger 40 and a muffler 4 sequentially toward the downstream side of the engine 2, the exhaust can be passed through the exhaust heat exchanger 40 still holding its high heat quantity and restraining the degree to which the heat of combustion of the exhaust generated in the catalytic converter 30 is cooled by the open air. Therefore, the heat quantity given to the coolant can be increased.

The volume of the exhaust is reduced through giving the exhaust heat to the coolant in the exhaust heat exchanger 40. Therefore, the amount of the exhaust having passed through the exhaust heat exchanger 40 can be reduced to enhance dissipative effect of the muffler 4.

Since, after flowing out of the engine 2, the coolant returns to the engine 2 passing sequentially through the exhaust heat exchanger 40 and the heater core 21, the coolant having received heat from the exhaust in the exhaust heat exchanger 40 is directly delivered to the heater core 21. Therefore, the degree to which the coolant is cooled by the open air, etc. between the exhaust heat exchanger 40 and the heater core 21, can be restrained to enhance heating effect further.

A second embodiment of the present invention will be described referring to FIG. 4. Besides, the detailed description will be omitted giving the like reference numbers to the like components as those in the first embodiment.

Figure 4:
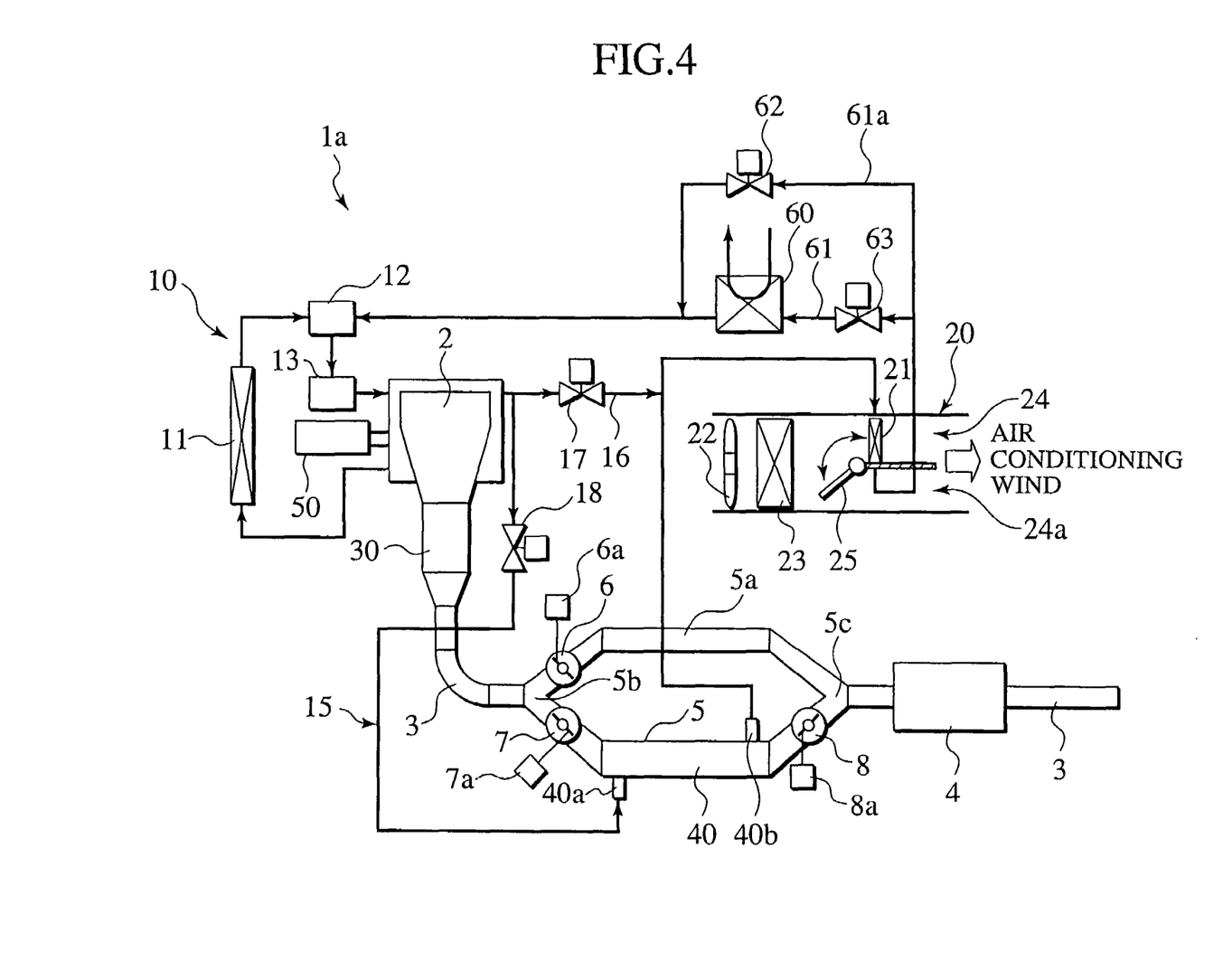
FIG. 4 is a diagram showing a schematic overall configuration of a second embodiment of the present invention.

A exhaust-heat recovery system 1a for an engine is, as shown in FIG. 4, provided with a bypass channel 16, through which a coolant is delivered from the engine 2 directly to a heater core 21 bypassing an exhaust heat exchanger 40, along a heating medium circulation channel 15. Further, a fourth switch valve 17 and a fifth switch valve 18 are provided as medium switching valves for closing either the heating medium circulation channel 15 or the bypass channel 16.

The fourth switch valve 17 is provided on the bypass channel 16 and the fifth switch valve 18 is provided on the heating medium circulation channel 15, which extends from the engine 2 to the exhaust heat exchanger 40. The fourth switch valve 17 and the fifth switch valve 18 are controlled to open or shut by command signals outputted from an engine controller 50 (refer to FIG. 1).

When the fourth switch valve 17 is opened and the fifth switch valve 18 is shut, the coolant having flowed out from the engine 2 is delivered directly to the heater core 21, passing not through the exhaust heat exchanger 40 but through the bypass channel 16.

When the fourth switch valve 17 is shut and the fifth switch valve 18 is opened, the coolant having flowed out from the engine 2 is delivered without passing through the bypass channel 16 directly to the exhaust heat exchanger 40. Heat between the exhaust and the coolant is exchanged in the exhaust heat exchanger 40.

Further, an oil-warmer 60 for exchanging heat between the coolant and an automatic transmission (not shown in the figure) is provided on the downstream side of the exhaust heat exchanger 40 in the heating medium circulation channel 15 (on the downstream side of the heater core 21 in the present embodiment). Moreover, the automatic transmission can be replaced with a manual transmission.

Additionally, a bypass channel 61a bypassing the oil-warmer 60 is provided, and a sixth switch valve 62 and a seventh switch valve 63 are also provided as warmer switching valves for closing either a channel 61 or the bypass channel 61a.

The sixth switch valve 62 is provided on the bypass channel 61a and the seventh switch valve 63 is provided on the channel 61. The sixth switch valve 62 and the seventh switch valve 63 are controlled to open or shut by command signals outputted from an engine controller 50 (refer to FIG. 1).

When the sixth switch valve 62 is opened and the seventh switch valve 63 is shut, the coolant having flowed out from the exhaust heat exchanger 40 and having passed through the heater core 21 returns to the engine 2 passing not through the oil-warmer 60 but along the bypass channel 61a.

When the sixth switch valve 62 is shut and the seventh switch valve 63 is opened, the coolant having flowed out from the exhaust heat exchanger 40 and having passed through the heater core 21 returns to the engine 2 passing not along the bypass channel 61a but through the oil-warmer 60.

Since either the channel 15 or the bypass channel 16 is closed by opening or shutting the fourth switch valve 17 and the fifth switch valve 18 in the exhaust-heat recovery system 1a for the engine, when the coolant is hot enough or when heating is not needed as in summer etc., total duct friction resistance can be reduced as a result of shortening the circulation path of the coolant and the miniaturization of the water pump 13 can also be achieved by bypassing the exhaust heat exchanger 40 and by passing the coolant having flowed out of the engine 2 along the channel 16.

Additionally, although the fourth switch valve 17 and the fifth switch valve 18 were provided as an medium switching valve, there is no necessity for limiting it thereto and any valve structures can be employed provided that closing of either the channel 15 or the bypass channel 16 can be done therewith.

Since the oil-warmer 60 for exchanging heat between the coolant and a lubricant for the transmission (not shown in the figure) is provided on the downstream side of the exhaust heat exchanger 40, the coolant having received heat from the exhaust via the exhaust heat exchanger 40 can be delivered to the oil-warmer 60. Consequently, in a cold period as in winter, etc. the lubricant for the transmission can be rapidly warmed to operate smoothly and the friction loss of the transmission gears can be reduced.

Since either the channel 61 or the bypass channel 61a is closed by opening or shutting the sixth switch valve 62 and the seventh switch valve 63, the timing of delivering the coolant having been heated in the exhaust heat exchanger 40 can be controlled as desired.

Thereby, the coolant passes along the bypass channel 61a until the coolant reaches a prescribed temperature, and after the coolant has reached the prescribed temperature the heated coolant can be delivered to the oil-warmer 60 by passing the coolant along the channel 61.

At the early stage of heating in a cold period, the coolant can be supplied to the oil-warmer 60 after giving priority to heating the interior of the vehicle by passing the coolant having been heated in the exhaust heat exchanger 40 through the heater core 21 and the bypass channel 61a, wherein the coolant on the downstream side of the heater core 21 coming to have some heat quantity to spare. Therefore, both improvement of the heating performance and smooth operation of the transmission are realized.

Further, the sixth switch valve 62 and the seventh switch valve 63 are provided as a warmer switching valves, there is no necessity for limiting it thereto and any valve structures can be employed provided that they have a valve structure such as to close either the channel 61 or the bypass channel 61a.

Although the exhaust-heat recovery system for the engine of the present invention has been described referring to the first and second embodiments as the examples, there is no necessity for limiting it thereto and any other embodiments can be employed without going beyond the gist of the present invention. For example, although heating was performed by passing the coolant for the engine 2 through the exhaust heat exchanger 40 and heater core 21, it can be also employed that a heating channel including the other heat-transfer medium, except the coolant, passing through the engine 2 is constituted and then the heat-transfer medium receiving heat from the exhaust heat exchanger 40 will be delivered to the heater core 21 and the oil-warmer 60.

What is claimed is:

1. An exhaust-heat recovery system for a vehicle comprising:
   a catalytic converter configured to let pass exhaust discharged from an engine and to burn catalytically combustible components in the exhaust;
   an exhaust heat exchanger configured to exchange heat between the exhaust having passed through the catalytic converter and a heat-transfer medium having passed through the engine;
   an air conditioner with a heat exchanger configured to generate a heating wind by means of the heat exchange between the heat-transfer medium having passed through the exhaust heat exchanger and an air conditioning wind; and
   an engine controller configured to perform an incremental control for increasing the combustible components in the exhaust to be burned in the catalytic converter by means of changing an operation condition of the engine when a prescribed heating condition is unsatisfied,
   wherein a performance of the incremental control is dependent on a motion condition of the vehicle, a load condition of the engine, the operation condition of the engine, a condition of a coolant and a capacity of the catalytic converter, and
   wherein the engine controller is further configured to:
      determine whether there is a demand for an increase in heating power of the air conditioner; and
      (i) if a determination is made that there is a demand for an increase in heating power of the air conditioner, permit the incremental control, and (ii) if a determination is made that there is no demand for an increase in heating power of the air conditioner, prevent the incremental control.

2. The exhaust-heat recovery system according to claim 1, wherein the incremental control on the combustible components is such that the amount of unburned hydrocarbon in the exhaust discharged from the engine is increased.

3. The exhaust-heat recovery system according to claim 1, wherein the incremental control on the combustible components is performed when the vehicle is at rest but the engine is still in operation.

4. The exhaust-heat recovery system according to claim 1, wherein the prescribed heating condition is specified by at least one of a temperature of the heat-transfer medium, a demand for an increase in heating power of the air conditioner, and an exchanged heat quantity in the exhaust heat exchanger.

5. The exhaust-heat recovery system according to claim 4, wherein the temperature of the heat-transfer medium is measured at, at least one of a heat-transfer medium channel from the engine to the exhaust heat exchanger, a heat-transfer medium channel from the exhaust heat exchanger to the heat exchanger, a heat-transfer medium channel from the heat exchanger to the engine, a heat-transfer medium passage within the engine, a heat-transfer medium passage within the exhaust heat exchanger and a heat-transfer medium passage within the heat exchanger.

6. The exhaust-heat recovery system according to claim 4, wherein the demand for an increase in heating power of the air conditioner is outputted from the air conditioner on the basis of at least one of the difference between a target temperature in the vehicle set by an occupant and an actual temperature in the vehicle or an actual temperature outside the vehicle, and a target temperature of an air conditioning wind at an outlet thereof.

7. The exhaust-heat recovery system according to claim 4, wherein the exchanged heat quantity in the exhaust heat exchanger is calculated from at least one of the difference between a temperature of the heat-transfer medium at an inlet portion of the exhaust heat exchanger and that at an outlet portion of the exhaust heat exchanger, the difference between a temperature of the exhaust at an inlet portion of the exhaust heat exchanger and that at an outlet portion of the exhaust heat exchanger, the difference between a volumetric flow rate of the exhaust at an inlet portion of the exhaust heat exchanger and that at an outlet portion of the exhaust heat exchanger, the exhaust volume in the engine, the exhaust temperature in the engine, the amount of fuel used in the engine, and the amount of air used in the engine.

8. The exhaust-heat recovery system according to claim 1, further comprising:
a bypass channel along which the exhaust having passed through the catalytic converter passes bypassing the exhaust heat exchanger;
a main channel along which the exhaust having passed through the catalytic converter passes through the exhaust heat exchanger; and
an exhaust channel switching valve for closing either the bypass channel or the main channel.

9. The exhaust-heat recovery system according to claim 1, wherein the exhaust discharged from the engine passes sequentially through the catalytic converter, the exhaust heat exchanger and a muffler toward the downstream side of the engine, and then is discharged into the air.

10. The exhaust-heat recovery system according to claim 1, wherein the heat-transfer medium flows out of the engine, and then passes sequentially through the exhaust heat exchanger and the heat exchanger, and returns to the engine.

11. The exhaust-heat recovery system according to claim 1, further comprising:
a bypass channel along which the heat-transfer medium is directly delivered bypassing the exhaust heat exchanger from the engine to the heat exchanger;
a main channel along which the heat-transfer medium passes through the exhaust heat exchanger; and
a medium channel switching valve for closing either the bypass channel or the main channel.

12. The exhaust-heat recovery system according to claim 1, further comprising:
an oil warmer configured to generate the heat exchange between the heat-transfer medium and a transmission lubricant on the downstream side of the heat exchanger.

13. The exhaust-heat recovery system according to claim 12, further comprising:
a bypass channel along which the heat-transfer medium passes bypassing the oil warmer;
a main channel along which the heat-transfer medium passes through the oil warmer; and
a warmer switching valve for closing either the bypass channel or the main channel.

14. The exhaust-heat recovery system according to claim 1, wherein the prescribed heating condition is a minimum temperature of a coolant.

15. The exhaust-heat recovery system according to claim 1, wherein the engine controller is configured to:
determine a state of operation of the engine, wherein the state of operation of the engine is selected from the group consisting of the engine being in operation and the engine being at rest; and
upon a determination of the state of operation of the engine, (i) perform the incremental control if a determination is made that the engine is in operation, and (ii) prevent performance of the incremental control if a determination is made that the engine is at rest.

16. The exhaust-heat recovery system according to claim 1, wherein the engine controller is configured to:
determine whether the engine is loaded; and
prevent performance of the incremental control if a determination is made that the engine is loaded.

17. The exhaust-heat recovery system according to claim 1, wherein the engine controller is configured to:
determine whether the engine is unloaded; and
perform incremental control if a determination is made that the engine is unloaded.

18. The exhaust-heat recovery system according to claim 1, wherein the engine controller is configured to:
determine whether the temperature of the coolant is at a temperature selected from the group consisting of higher than, less than and equal to a prescribed temperature; and
(i) if a determination is made that the temperature of the coolant is less than the prescribed temperature, permit incremental control, and (ii) if a determination is made that the temperature of the coolant is higher than or equal to the prescribed temperature, prevent incremental control.

19. The exhaust-heat recovery system according to claim 1, wherein the engine controller is configured to:
determine whether a flow rate of the exhaust is larger than, less than or equal to a prescribed flow rate; and
(i) if a determination is made that the flow rate is larger than or equal to the prescribed flow rate, prevent the incremental control, and (ii) if a determination is made that the flow rate is less than the prescribed flow rate, permit the incremental control.

20. An exhaust-heat recovery system for a vehicle comprising:
a catalytic converter configured to let pass exhaust discharged from an engine and to burn catalytically combustible components in the exhaust;
an exhaust heat exchanger configured to exchange heat between the exhaust having passed through the catalytic converter and a heat-transfer medium having passed through the engine;
an air conditioner with a heat exchanger configured to generate a heating wind by means of the heat exchange between the heat-transfer medium having passed through the exhaust heat exchanger and an air conditioning wind; and an engine controller configured to perform an incremental control for increasing the combustible components in the exhaust to be burned in the catalytic converter by means of changing an operation condition of the engine when a prescribed heating condition is unsatisfied, wherein a performance of the incremental control is dependent on a motion condition of the vehicle, a load condition of the engine, the operation condition of the engine, a condition of a coolant and a capacity of the catalytic converter, and wherein the engine controller is configured to:
  determine whether a flow rate of the exhaust is larger than, less than or equal to a prescribed flow rate; and
  (i) if a determination is made that the flow rate is larger than or equal to the prescribed flow rate, prevent the incremental control, and (ii) if a determination is made that the flow rate is less than the prescribed flow rate, permit the incremental control.

21. An exhaust-heat recovery system for a vehicle comprising:
  a catalytic converter configured to let pass exhaust discharged from an engine and to burn catalytically combustible components in the exhaust;
  an exhaust heat exchanger configured to exchange heat between the exhaust having passed through the catalytic converter and a heat-transfer medium having passed through the engine;
  an air conditioner with a heat exchanger configured to generate a heating wind by means of the heat exchange between the heat-transfer medium having passed through the exhaust heat exchanger and an air conditioning wind; and
  an engine controller configured to:
    determine whether there is a demand for an increase in heating power of the air conditioner; and
    (i) if a determination is made that there is a demand for an increase in heating power of the air conditioner, permit an incremental control for increasing the combustible components in the exhaust to be burned in the catalytic converter, and (ii) if a determination is made that there is no demand for an increase in heating power of the air conditioner, prevent the incremental control.

22. An exhaust-heat recovery system for a vehicle comprising:
  a catalytic converter configured to let pass exhaust discharged from an engine and to burn catalytically combustible components in the exhaust;
  an exhaust heat exchanger configured to exchange heat between the exhaust having passed through the catalytic converter and a heat-transfer medium having passed through the engine;
  an air conditioner with a heat exchanger configured to generate a heating wind by means of the heat exchange between the heat-transfer medium having passed through the exhaust heat exchanger and an air conditioning wind; and
  an engine controller is configured to:
    determine whether a flow rate of the exhaust is larger than, less than or equal to a prescribed flow rate; and
    (i) if a determination is made that the flow rate is larger than or equal to the prescribed flow rate, prevent an incremental control for increasing the combustible components in the exhaust to be burned in the catalytic converter, and (ii) if a determination is made that the flow rate is less than the prescribed flow rate, permit the incremental control.

* * * * *